(12) United States Patent
Hutter, III

(10) Patent No.: US 7,391,624 B2
(45) Date of Patent: Jun. 24, 2008

(54) ADJUSTABLE MOUNTING BRACKET

(75) Inventor: Charles G. Hutter, III, Carson City, NV (US)

(73) Assignee: Physical Systems, Inc., Carson City, NV (US)

( * ) Notice: Subject to any disclaimer, the term of this patent is extended or adjusted under 35 U.S.C. 154(b) by 211 days.

(21) Appl. No.: 11/308,813

(22) Filed: May 11, 2006

(65) Prior Publication Data

US 2007/0262219 A1 Nov. 15, 2007

(51) Int. Cl.
*H05K 7/02* (2006.01)
(52) U.S. Cl. .................. 361/810; 361/807; 361/749; 174/138 R; 174/138 G
(58) Field of Classification Search .............. 361/749, 361/952–759, 807–810; 248/229.12, 228.3, 248/214, 35, 543; 428/40.9, 41.8, 66.6; 174/138
See application file for complete search history.

(56) References Cited

U.S. PATENT DOCUMENTS

| | | | |
|---|---|---|---|
| 4,302,492 A | 11/1981 | Hutter, III | |
| 4,338,151 A | 7/1982 | Hutter, III | |
| 4,390,576 A | 6/1983 | Hutter, III | |
| 4,778,702 A | 10/1988 | Hutter, III | |
| 4,822,656 A | 4/1989 | Hutter, III | |
| 4,842,912 A | 6/1989 | Hutter, III | |
| 5,013,391 A * | 5/1991 | Hutter et al. | 156/578 |
| 5,603,472 A | 2/1997 | Hutter, III | |
| RE35,677 E * | 12/1997 | O'Neill | 248/551 |
| 5,704,747 A | 1/1998 | Hutter, III et al. | |
| 5,822,918 A * | 10/1998 | Helfman et al. | 47/39 |
| 6,727,466 B2 | 4/2004 | Hutter, III | |
| 6,773,780 B2 | 8/2004 | Hutter, III | |
| 7,000,585 B2 * | 2/2006 | Clemons et al. | 123/195 C |
| 7,191,990 B2 * | 3/2007 | Hutter, III | 248/229.12 |
| 2005/0284995 A1 | 12/2005 | Hutter, III | |

* cited by examiner

*Primary Examiner*—Dean A. Reichard
*Assistant Examiner*—Xiaoliang Chen
(74) *Attorney, Agent, or Firm*—Kelly Lowry & Kelley, LLP; Stuart O. Lowry

(57) ABSTRACT

An adjustable mounting bracket for secure adhesive mounting onto an exposed edge of a substrate, wherein the mounting bracket is adapted for subsequently supporting a selected structure such as tubing, wire bundles, etc., relative to the substrate. The mounting bracket includes slidably interfitting, generally L-shaped bracket members which cooperatively define a slidably overlying pair of mounting plates and an associated pair of slidably separable clamp jaw plates having inboard faces carrying a selected bonding agent and adapted to seat firmly against opposed substrate edge surfaces. A resilient fixture pin is carried by the mounting plates and can be actuated to apply a positive force urging the clamp jaw plates against the opposed surfaces of the substrate edge of the duration of a bonding agent cure time, after which the fixture pin can be forcibly removed from the mounting bracket.

18 Claims, 4 Drawing Sheets

ADJUSTABLE MOUNTING BRACKET

BACKGROUND OF THE INVENTION

This invention relates generally to mounting brackets and fixtures adapted for connection as by adhesive attachment to a supporting substrate, wherein the mounting bracket is adapted for quick and easy subsequent mounting of a selected structure such as tubing, wire bundles, etc., relative to the substrate. More particularly, this invention relates to an improved adjustable mounting bracket designed for secure adhesive bond-on attachment to an exposed edge of a substrate, such as mounting onto a rib protruding from the substrate or mounting onto an inner diameter edge of an opening formed in the substrate.

Adhesive attachment assemblies or fixtures and related methods for securing an attachment component or element such as a patch, threaded screw, or other structure onto a supporting surface or substrate are generally known in the art. For example, it may necessary to apply a thin patch to the skin of an aircraft or to the hull of a boat to repair a hole therein. Alternately, it may be desirable to mount a threaded element, such as a threaded stud or nut, or other device onto a substrate such as an aircraft panel without requiring a hole to be made in the substrate, and wherein the threaded element or the like is adapted for subsequent mounting and/or supporting of a selected structure such as tubing, wire bundles, an electrical junction box, or the like. Exemplary attachment assemblies and related attachment fixtures of this general type are shown and described in U.S. Pat. Nos. 4,302,492; 4,338,151; 4,390,576; 4,668,546; 4,778,702; 4,822,656; 4,842,912; 5,013,391; 5,704,747; 5,603,472; 6,727,466 and 6,773,780, all of which are incorporated by reference herein. In these exemplary devices, the attachment component is urged or pressed against the substrate for at least some minimum time period to allow, for example, curing of an adhesive bonding agent such as a curable epoxy or the like to achieve a substantially optimized and secure bond with the substrate.

In other applications, the substrate may include an exposed edge having a position and size for convenient mounting of an attachment component used for subsequent mounting and supporting of tubing, wire bundles, electrical junction boxes, and other structures onto the substrate. For example, in an aircraft interior, a substrate panel may incorporate a standing rib having a thickness and height suitable for mounting the attachment component thereon. Alternately, the substrate panel may have one or more openings such as a lightening hole formed therein with a position and size to form an inner diameter exposed edge defined by the thickness of the substrate panel, wherein this exposed edge provides a convenient site for mounting of the attachment component. However, attachment components designed for adjustable quick and easy connection as by adhesive attachment to the exposed substrate edge have not been available, particularly with respect to accommodating a range of different edge wall thicknesses.

U.S. Publication 2005/0284995, published Dec. 29, 2005, discloses an adjustable mounting bracket for quick and easy attachment to an exposed substrate edge, wherein the mounting bracket carried a threaded member such as a nut or bolt for subsequent mounting of a selected structure such as tubing, wire bundles, etc., relative to the substrate. The adjustable mounting bracket comprises a pair of generally L-shaped bracket members defining a slidably overlying pair of mounting plates and an associated pair of slidably separable clamp jaw plates. A selected adhesive bonding agent is applied to inboard-facing surfaces of the clamp jaw plates which are then pressed firmly against opposed surfaces of the substrate edge for secure bond-on attachment thereto. At the conclusion of a bonding agent cure time, the threaded member is assembled with the selected structure to be supported relative to the substrate.

The present invention is directed to an improved adjustable mounting bracket of the general type disclosed in U.S. Publication 2005/0284995, wherein the mounting plates are retained in slidably overlying relation by a resilient fixture pin. This fixture pin is adapted for actuation to apply a positive force urging the clamp jaw plates into intimate seated engagement with the opposed substrate edges for the duration of the bonding agent cure time, to achieve a substantially optimum strength bonded attachment interface therewith. Thereafter, the fixture pin is adapted for quick and easy forced separation from the mounting bracket.

SUMMARY OF THE INVENTION

In accordance with the invention, an improved attachment component comprising an adjustable mounting bracket is provided for secure and stable mounting as by bond-on adhesive attachment onto an exposed edge of a supporting substrate, wherein the mounting bracket is adapted for quick and easy subsequent mounting of a selected structure such as tubing, wire bundles, etc., relative to the substrate. The adjustable mounting bracket comprises a pair of slidably interfitting bracket members each having a generally L-shaped configuration to cooperatively define a slidably overlying pair of mounting plates and an associated pair of slidably separable clamp jaw plates. The slidably interfitting mounting plates accommodate adjustable spaced-apart separation of the clamp jaw plates to seat firmly against opposed surfaces of the exposed substrate edge, such as mounting onto a rib protruding from the substrate or mounting onto an inner diameter edge of an opening formed in the substrate. A resilient fixture pin is carried by the mounting plates and can be actuated to apply a positive force urging the clamp jaw plates against the opposed surfaces of the substrate edge of the duration of a bonding agent cure time, after which the fixture pin can be forcibly removed from the mounting bracket In one preferred form of the invention, the fixture pin comprises an elongated retainer element formed from a selected elastomeric material and fitted through aligned mounting plate ports to support and retain the mounting plates in slidably overlying relation. More specifically, a first mounting plate carries a threaded member, such as threaded nut, in general aligned with the port formed therein for subsequent assembly with the selected structure to be supported relative to the substrate. The fixture pin has a narrow central spring segment extending through the mounting plate ports and the associated threaded member, wherein opposed ends of this spring segment are joined to radially enlarged shoulder segments bearing respectively against the threaded member and a second mounting plate to retain the two mounting plates in slidably overlying relation.

At least one of the mounting plate ports is elongated to accommodate variable spaced-apart positioning of the clamp jaw plates for reception of the exposed substrate edge, and to seat inboard-facing surfaces of the clamp jaw plates firmly against the opposed surfaces of the substrate edge. A bonding agent such as a curable epoxy, a pressure sensitive adhesive, or resilient pads coated with an adhesive agent is applied to the inboard surfaces of the clamp jaw plates for secure attachment of the adjustable bracket to the substrate.

The fixture pin is actuated by displacing the radially enlarged shoulder abutting the second mounting plate in a direction toward the substrate edge, thereby stretch-elongating the central spring segment to apply a tensile force urging the pin shoulder back toward an initial position. However, the radially enlarged shoulder defines a sufficiently large surface area in frictional engagement with the second mounting plate whereby the pin shoulder applies a positive force urging the mounting plates to displace in a direction pressing and retaining the respective clamp jaw plates in firm seated engagement with the opposed sides of the substrate edge for the duration of a bonding agent cure time.

After the bonding agent is cured, the fixture pin is forcibly removed from the mounting plates as by pulling therefrom, thereby leaving the threaded member thereon exposed for subsequent assembly with the selected structure to be supported relative to the substrate. In this regard, in the example of a threaded nut, the threaded nut is adapted for thread-in connection with a threaded bolt or screw used for connecting the selected structure such as a length of tubing, a bundle of wires, or the like to the mounting bracket.

Other features and advantages of the present invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
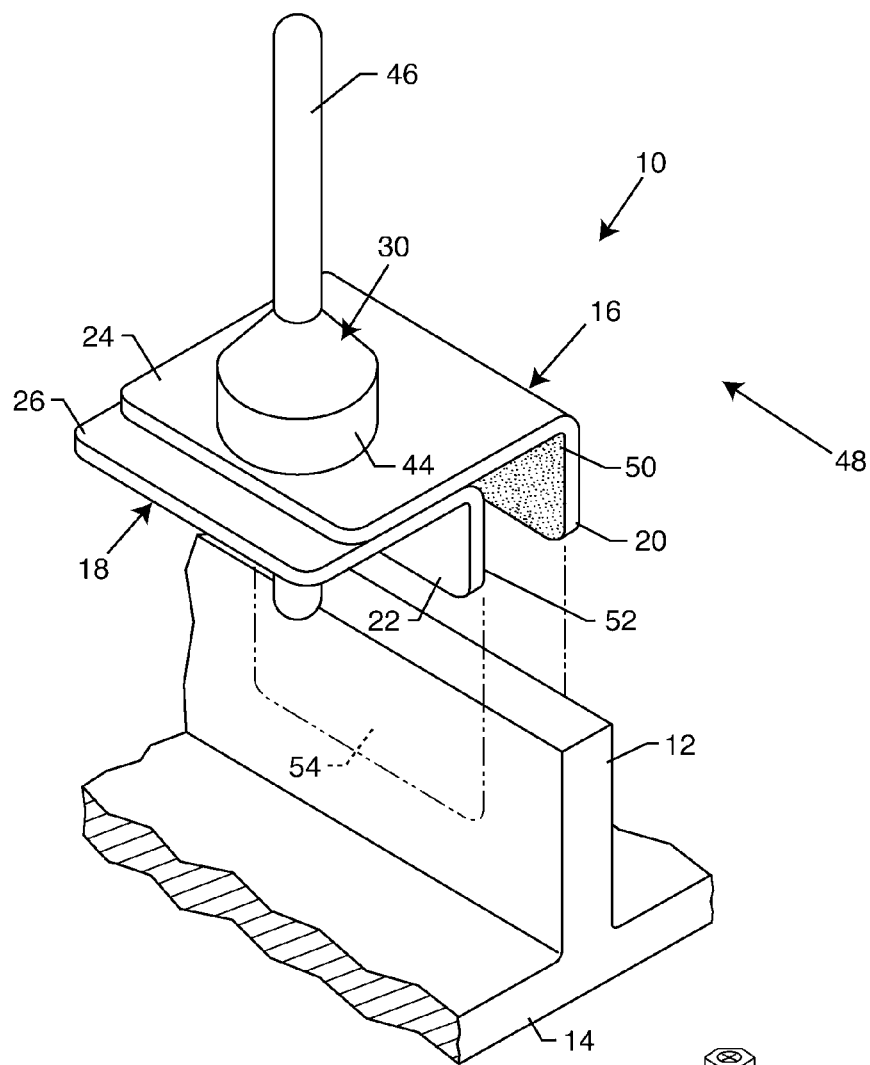
FIG. 1 is an exploded perspective view of an adjustable mounting bracket in accordance with one preferred form of the invention, for mounting onto an exposed edge of a substrate.
Figure 9:
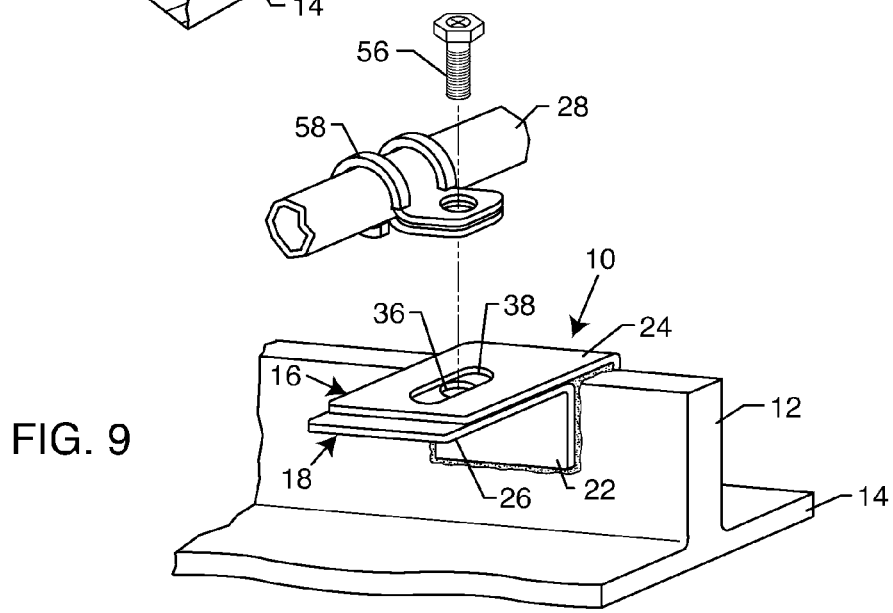
FIG. 9 is a fragmented and exploded perspective showing use of the installed mounting bracket for supporting a selected structure relative to the substrate edge.

As shown in the exemplary drawings, an adjustable mounting bracket referred to generally in FIG. 1 by the reference numeral 10 is provided for quick and easy mounting as by adhesive connection onto an exposed edge 12 such as the illustrative standing rib formed on a substrate 14. The mounting bracket 10 includes a pair of adjustable bracket members 16 and 18 each having a generally L-shaped configuration and slidably nested one within the other to define a pair of clamp jaw plates 20 and 22 adapted for secure and stable adhesive attachment to opposed surfaces defined on the substrate rib or edge 12. The mounting bracket further includes a pair of slidably overlying mounting plates 24 and 26 adapted for convenient mounted support of one or more selected structures 28 (FIG. 9) such as one or more lengths of tubing, wire bundles, or the like relative to the substrate 14.

In accordance with a primary aspect of the invention, the bracket members 16, 18 are initially supported and retained in a nested configuration by means of a resilient fixture pin 30 extending through the slidably overlying mounting plates 24, 26. The fixture pin 30 accommodates sliding movement of these mounting plates 24, 26 relative to each other, so that the associated clamp jaw plates 20, 22 can be displaced toward and away from each other to fit and seat against the opposed surfaces of the substrate edge 12. In this position, the fixture pin 30 is actuatable to apply a positive force urging or drawing the clamp jaw plates 20, 22 firmly against the opposed surfaces of the substrate edge 12, to achieve a substantially optimized strength adhesive bonded attachment interface therewith.

FIGS. 1-4 depict the adjustable mounting bracket 10 of the present invention in accordance with one preferred form, for use in secure and stable mounting of one or more selected auxiliary structures such as a length of tubing 28 (shown in FIG. 9) relative to the substrate 14. In this regard, the substrate 14 may comprise a relatively thin-walled panel or non-metal panel of the type used, e.g., in aircraft construction to incorporate an exposed edge such as the illustrative standing rib 12. The adjustable mounting bracket 10 comprises an attachment component designed for quick and easy mounting onto the exposed substrate edge 12, while accommodating a range of different edge wall thicknesses.

The adjustable mounting bracket 10 comprises the pair of generally L-shaped bracket members 16, 18 constructed from a suitable metal or nonmetallic material, and each having a generally L-shaped configuration. A first or outer bracket member 16 defines one of the clamp jaw plates 20 joined at one end thereof to the associated mounting plate 24 which is shown extending from the clamp jaw plate generally at a right angle thereto. The second bracket member 18 defines an inner bracket member with its mounting plate 26 nested in slidable parallel relation at the underside of the outer mounting plate 24, thereby positioning the associated second clamp jaw plate 22 beneath the outer mounting plate 24 in slidably separable and generally parallel relation with the outer clamp jaw plate 20. While these bracket members 16, 18 are shown with a generally right-angle configuration between the respective clamp jaw and mounting plate pairs 20, 24 and 22, 26, persons skilled in the art will appreciate that alternative angular orientations may be used.

Figure 2:
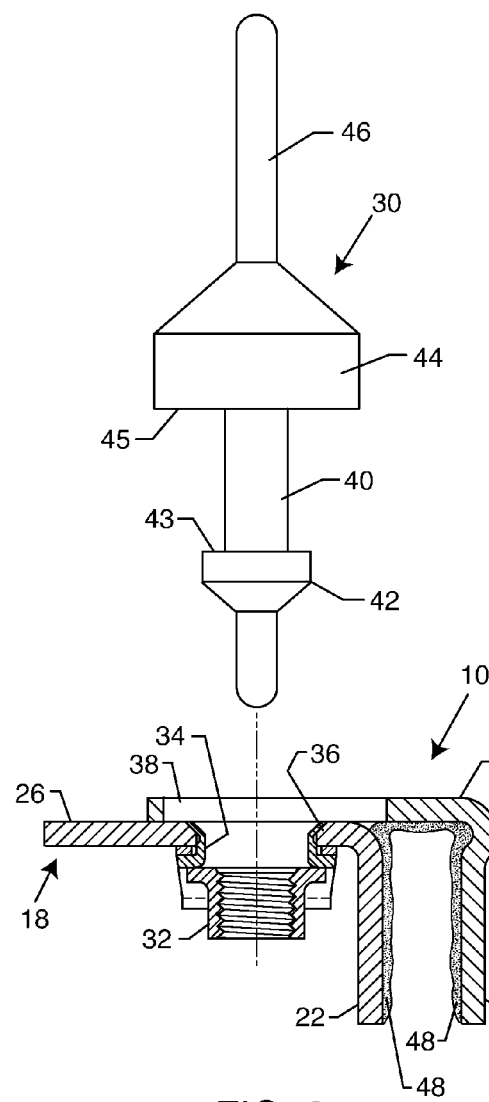
FIG. 2 is a vertical sectional view showing the mounting bracket of FIG. 1 in exploded relation with a resilient fixture pin.
Figure 3:
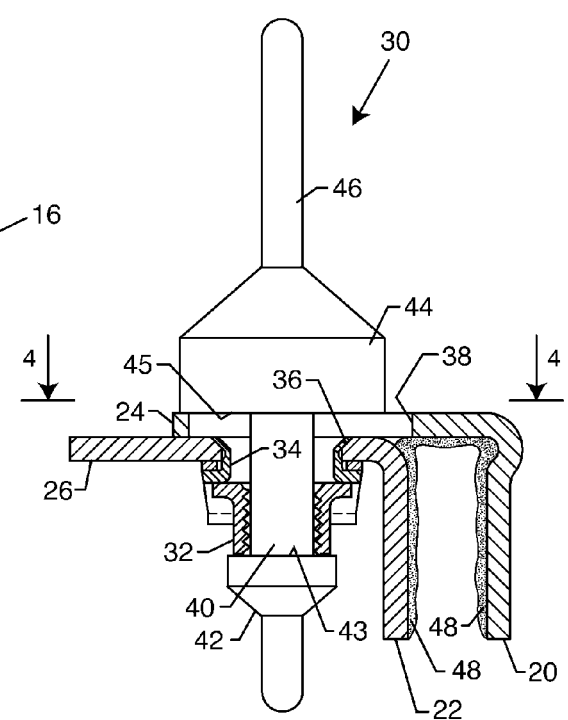
FIG. 3 is a vertical sectional view showing the mounting bracket and fixture pin in assembled relation.
Figure 4:
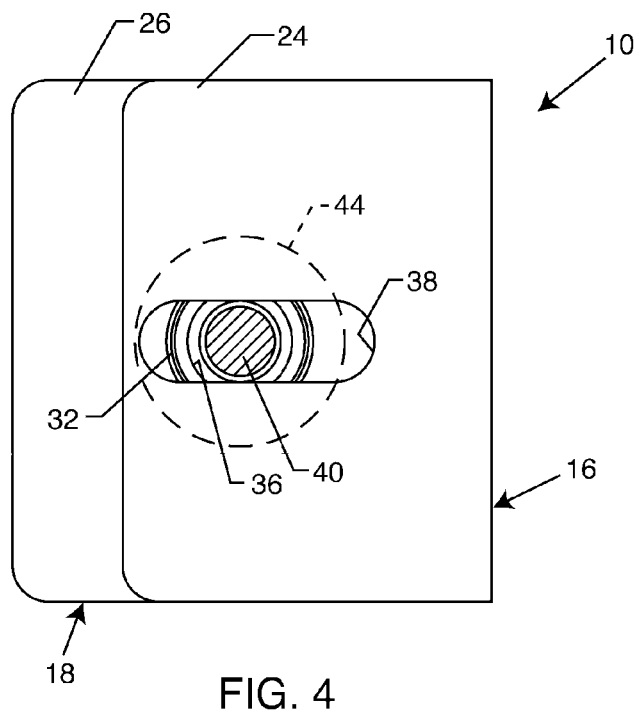
FIG. 4 is a horizontal sectional view taken generally on the line 4-4 of FIG. 3.

The mounting plate 26 of the second bracket member 18 includes a fastener member 32 such as a threaded nut or the like for subsequent use in supporting the selected structure 28 to be carried by the bracket 10 relative to the substrate 14. FIGS. 2-3 show this threaded member 32 in the form of an internally threaded nut carried by a nut retainer 34 for a small degree of floating movement at the underside of the mounting plate 26. This nut retainer 34 may be constructed and installed onto the mounting plate 26 in the same manner as disclosed in U.S. Pat. No. 5,013,391, which is incorporated by reference herein. Importantly, the nut retainer 34 supports the nut 32 in substantial coaxial alignment with a port 36 formed in the associated mounting plate 26, wherein this port 36 is generally aligned in turn with an elongated port slot 38 formed in the slidably overlying mounting plate 24 of the first or upper bracket member 16. The fixture pin 30 extends through these mounting plate openings 36, 38 for initially retaining the associated mounting plates 24, 26 in the desired slidably overlying relation, with the elongated port slot 38 extending in a direction generally toward the associated clamp jaw plate 20, to accommodate sliding movement of the outer mounting plate 24 in a direction to displace the associated clamp jaw plate 20 toward and away from the other clamp jaw plate 22.

In the preferred form as shown, the fixture pin 30 comprises an elongated rod-like component formed from a suitable elastomeric material or the like, preferably as a one-piece or unitary molding, to include a stretchable central spring or neck segment 40 having a size and shape to fit through the mounting plate openings 36, 38 and also to fit through the threaded nut 32. This central spring segment is formed axially between a pair of radially enlarged lands 42 and 44 respectively defining a pair of stop shoulders 43 and 45 presented axially toward each other for respectively engaging a lower or underside margin of the nut 32, and for engaging an exposed upper surface of the outer mounting plate 24 in the region surrounding the elongated port slot 38 formed therein. In this regard, in the preferred form, the lower shoulder 43 has a relatively narrow profile of sufficient radial dimension to form a stop engaging the lower margin or lower end of the nut 32, whereas the upper shoulder 45 has a substantially larger profile defining a substantially greater surface area engaging the exposed upper surface of the outer mounting plate 24. An elongated tail 46 of relatively narrow cross section protrudes upwardly from the upper land 44 for facilitated manual grasping in the course of forcibly removing the fixture pin 30 from the bracket 10, as will be described in more detail.

Figure 5:
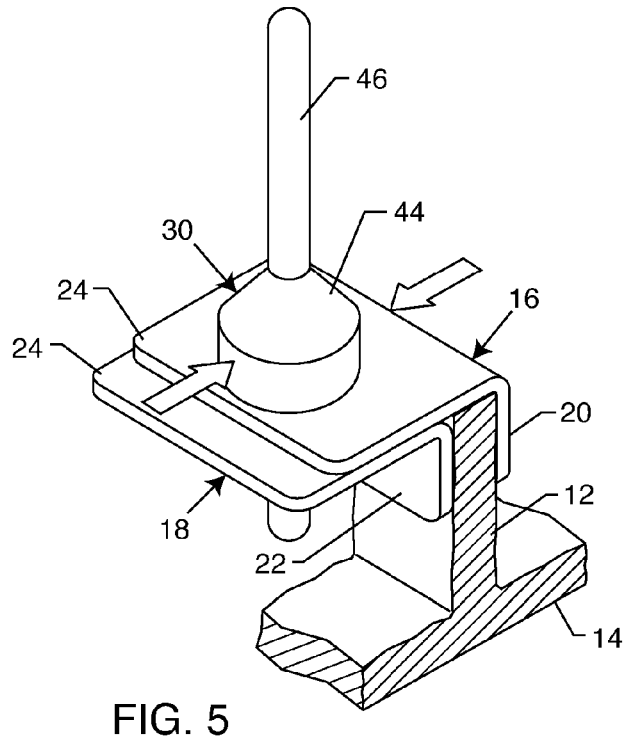
FIG. 5 is a perspective view similar to FIG. 1, but illustrating the adjustable mounting bracket installed onto a substrate edge.
Figure 6:
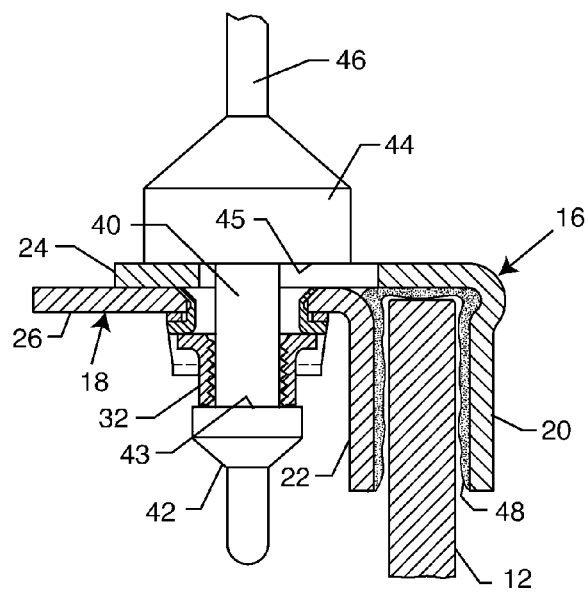
FIG. 6 is a fragmented vertical sectional view taken generally on the line 6-6 of FIG. 5.

In use, a suitable bonding agent 48 (FIG. 1) such as a curable epoxy or the like is applied to the inboard or facing surfaces 50 and 52 of the two clamp jaw plates 20, 22. The spaced-apart separation of the two clamp jaw plates 20, 22 is then adjustably selected by appropriate sliding displacement of the two mounting plates 24, 26 relative to each other. The elongated port slot 38 in the upper mounting plate 24 has a sufficient longitudinal dimension to accommodate such separable displacement of the clamp jaw plates 20, 22 through a range of adjustment suitable to fit and seat firmly against the opposite surfaces of the substrate edge 12 having a range of different thickness dimensions. The clamp jaw plates 20, 22 with bonding agent 48 thereon are firmly seated or landed against the opposed surfaces of the standing rib 12 or other structure defining the substrate edge, as depicted by the dotted line landing zone 54 in FIG. 1. In this position, the inner bracket member 18 is adjustably positioned relative to the outer bracket member 16 by slidably displacing the inner mounting plate 26 in a direction to seat and preferably to squeeze or clamp the associated pair of clamp jaw plates 20, 22 firmly against the substrate rib or edge 12 (FIGS. 5-6).

Figure 7:
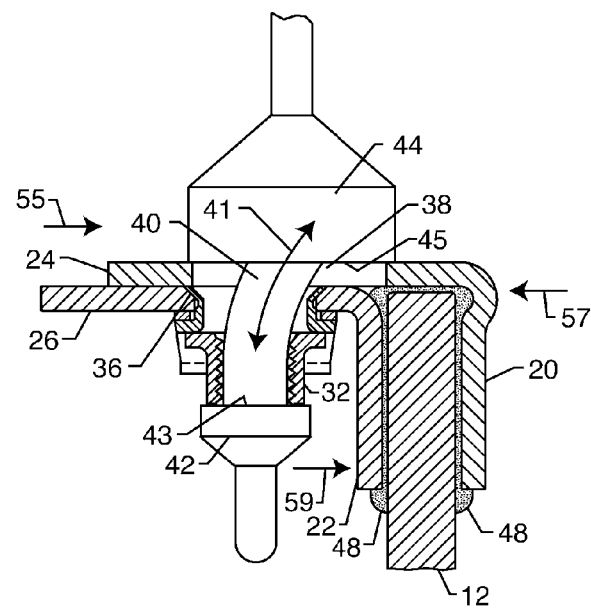
FIG. 7 is a fragmented sectional view similar to FIG. 6, but depicting actuation of the fixture pin to apply a positive force urging a pair of spaced-apart clamp jaw plates of the mounting bracket firmly against opposed surfaces of the substrate edge.

The fixture pin 30 is then displaced laterally along and relative to the port slot 38, to a deformed position which effectively applies a positive force urging the adhesive-carrying clamp jaw plates 20, 22 firmly against the substrate edge 12, as viewed in FIG. 7. More particularly, as shown, the upper land 44 is manually displaced along the port slot 38 in a direction toward the clamp jaw plates 20, 22 (as indicated by arrow 55) and the substrate edge 12 disposed therebetween, within the limits of the elongated port slot 38 formed in the outer mounting plate 24, and to a position laterally misaligned with the port 36 in the underlying inner mounting plate 26. Such displacement functions to stretch-elongate the central neck segment 40 of the fixture pin 30 to a bent or deformed configuration as shown. As a result, the central neck segment 40 applies a tensile force acting between the upper land 44 and the lower land 42, but wherein this tensile force has both vertical and horizontal vector components as depicted by arrow 41 in FIG. 7. That is, the stop shoulder 45 on the upper land 44 is urged firmly in a downward direction against the exposed upper surface of the outer mounting plate 24, and is also pulled in a horizontal direction urging the associated clamp jaw plate 20 firmly (as indicated by arrow 57) against one side of the substrate edge 12. Similarly, the stop shoulder 43 on the lower land 42 is urged firmly in an upward direction against the underside margin of the nut 32, and also pulls that nut 32 in a generally horizontal direction (as indicated by arrow 59) urging the associated clamp jaw plate 22 firmly against the opposite side of the substrate edge 12. Importantly, friction acting between the engaged surface area of the outer mounting plate 24 and the stop shoulder 45 engaged therewith is sufficient to retain the fixture pin 30 in the deformed configuration (FIG. 7) for a time period sufficient to achieve substantial curing of the bonding agent 48.

Figure 8:
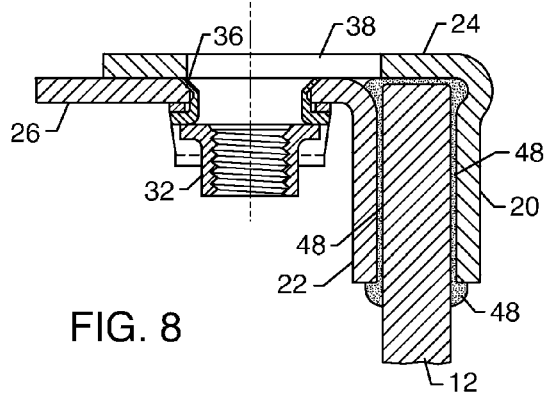
FIG. 8 is a fragmented sectional view similar to FIGS. 6 and 7, but depicting forced removal of the fixture pin from the adjustable mounting bracket.

When the bonding agent is substantially completely cured, the fixture pin 30 can be forcibly separated from the mounting bracket 10 by grasping and pulling the elongated upper tail 46 (as indicated by arrow 60 in FIG. 8). In this regard, the bond-on attachment strength, when the bonding agent is substantially cured, significantly exceeds the force required to pull axially upwardly on the fixture pin 30 with a force sufficient to cause the narrower lower land 42 to collapse and compress for upward displacement through the nut 32 and for separation from the adhesively installed bracket 10. Such removal of the fixture pin 30 leaves the threaded nut 32 exposed through the openings 36, 38 formed in the overlying mounting plates 24, 26 for subsequent connection to the selected structure 28, such as a screw 56 (FIG. 9) used to mount a clamp bracket 58 or the like, wherein this clamp bracket 58 in turn carries a length of tubing 28 or the like. Alternative forms and types of structures 28 suitable for mounting onto the bracket 10 will be apparent to persons skilled in the art.

Although an embodiment has been described in detail for purposes of illustration, various modifications may be made without departing from the scope and spirit of the invention. For example, persons skilled in the art will recognize and appreciate that the various features shown and described in any one of the alternative preferred forms of the invention shown and described herein may be employed any one of the other disclosed embodiments. Accordingly, no limitation on the invention is intended by way of the foregoing description and accompanying drawings, except as set forth in the appended claims.

What is claimed is:

1. An adjustable mounting bracket, comprising:
    first and second bracket members each defining a mounting plate, and a clamp jaw plate oriented angularly relative to said mounting plate, said mounting plate of said first bracket member having an elongated port slot formed therein and extending generally toward the associated clamp jaw plate, and said mounting plate of said second bracket member having a port formed therein; and
    a resilient fixture pin having a neck segment extending between a pair of radially enlarged lands, said neck segment being receivable through said port slot and said port for respectively retaining said mounting plates in slidably overlying relation with said clamp jaw plates in spaced-apart relation, said mounting plate of said first bracket member being slidably movable within the limits of said port slot relative to said mounting plate of said second bracket member for adjustably selecting the spacing between said clamp jaw plates;

said clamp jaw plates respectively defining an adjustably spaced pair of facing surfaces for carrying a selected bonding agent thereon and for seating against opposite sides of a substrate edge for mounting the bracket onto the substrate edge;

said fixture pin being movable to a deformed position with one of said lands displaced relative to said port slot in a direction generally toward said clamp jaw plates, and to a position misaligned with said port, to stretch-elongate said neck segment and thereby apply a positive force urging said clamp jaw plates toward each other.

2. The adjustable mounting bracket of claim 1 wherein said clamp jaw plates are oriented in spaced-apart, generally parallel relation.

3. The adjustable mounting bracket of claim 1 wherein each of said bracket members has a generally L-shaped configuration defining said mounting plate disposed substantially at a right angle to said clamp jaw plate.

4. The adjustable mounting bracket of claim 1 wherein the selected bonding agent comprises a curable bonding agent, said fixture pin applying said positive force to urge said facing surfaces of said clamp jaw plates into firm seated engagement with the opposite sides of the substrate edge for at least the duration of a cure time for said bonding agent.

5. The adjustable mounting bracket of claim 4 wherein said fixture pin is removable from said bracket members at the conclusion of said bonding agent cure time.

6. The adjustable mounting bracket of claim 1 further including a fastener member carried by said mounting plate of said second bracket member, said fixture pin lands respectively engaging said fastener member and said mounting plate of said first bracket member.

7. The adjustable mounting bracket of claim 6 wherein said fastener member comprises a threaded nut.

8. The adjustable mounting bracket of claim 1 further including means for mounting a selected structure to the bracket, whereby the bracket supports said selected structure relative to the substrate edge.

9. The adjustable mounting bracket of claim 1 wherein said fixture pin further includes an elongated tail extending from at least one of said lands.

10. An adjustable mounting bracket, comprising:
a first bracket member including a first mounting plate, and a first clamp jaw plate oriented angularly with respect thereto, said first mounting plate having an elongated port slot formed therein and extending generally toward said clamp jaw plate;
a second bracket member including a second mounting plate, and a second clamp jaw plate oriented angularly with respect thereto, said second mounting plate having a port formed therein, and said second mounting plate member further including a fastener member supported generally in alignment with said port; and
a fixture pin having a resilient neck segment extending between a first and second radially enlarged lands;
said fixture pin neck segment extending through said first mounting plate port slot and said second mounting plate port, with said first and second lands respectively engaging and retaining said first and second mounting plates in slidably overlying relation with said first and second clamp jaw plates in spaced-apart relation, said first mounting plate being slidably movable within the limits of said port slot therein relative to said second mounting plate for variably spacing said first and second clamp jaw plates;
said first and second clamp jaw plates respectively defining an adjustably spaced pair of facing surfaces for carrying a selected bonding agent thereon and for seating against opposite sides of a substrate edge for mounting the bracket onto the substrate edge;
said fixture pin being movable to a deformed position with said first land displaced relative to said port slot in a direction generally toward said clamp jaw plates, and to a position misaligned with said port, to stretch-elongate said neck segment and thereby apply a positive force urging said first and second clamp jaw plates toward each other.

11. The adjustable mounting bracket of claim 10 wherein said first and second clamp jaw plates are oriented in spaced-apart, generally parallel relation.

12. The adjustable mounting bracket of claim 10 wherein the selected bonding agent comprises a curable bonding agent, said fixture pin applying said positive force to urge said facing surfaces of said clamp jaw plates into firm seated engagement with the opposite sides of the substrate edge for at least the duration of a cure time for said bonding agent.

13. The adjustable mounting bracket of claim 12 wherein said fixture pin is removable from said bracket members at the conclusion of said bonding agent cure time.

14. The adjustable mounting bracket of claim 10 wherein said second land engages said fastener member.

15. The adjustable mounting bracket of claim 14 wherein said fastener member comprises a threaded nut.

16. The adjustable mounting bracket of claim 10 wherein said first land defines a stop shoulder of relatively large surface area for frictionally engaging said first mounting plate.

17. The adjustable mounting bracket of claim 16 wherein said second land defines a comparatively smaller stop shoulder adapted for collapse and displacement through said port and said port slot upon forced removal of said fixture pin from said bracket members.

18. The adjustable mounting bracket of claim 10 wherein said fixture pin further includes an elongated tail extending from said first land.

* * * * *